(12) United States Patent
Abe

(10) Patent No.: US 8,405,866 B2
(45) Date of Patent: Mar. 26, 2013

(54) PRINTER AND METHOD OF PRINTING

(75) Inventor: Seiji Abe, Toyohashi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 556 days.

(21) Appl. No.: 12/646,923

(22) Filed: Dec. 23, 2009

(65) Prior Publication Data

US 2010/0165408 A1    Jul. 1, 2010

(30) Foreign Application Priority Data

Dec. 26, 2008 (JP) ................................. 2008-332590

(51) Int. Cl.
*G06K 15/02* (2006.01)

(52) U.S. Cl. .......... 358/1.18; 358/1.1; 358/1.9; 348/169

(58) Field of Classification Search .................. None
See application file for complete search history.

(56) References Cited

U.S. PATENT DOCUMENTS

| | | | |
|---|---|---|---|
| 7,848,596 B2* | 12/2010 | Widdowson | 382/294 |
| 2002/0033959 A1* | 3/2002 | Ando et al. | 358/1.13 |
| 2004/0070789 A1* | 4/2004 | Meerwald et al. | 358/1.16 |
| 2004/0189804 A1* | 9/2004 | Borden et al. | 348/169 |
| 2005/0152004 A1* | 7/2005 | Park | 358/1.18 |
| 2006/0285835 A1* | 12/2006 | Suzuki et al. | 386/126 |
| 2007/0097435 A1* | 5/2007 | Terajima | 358/1.16 |
| 2007/0109601 A1* | 5/2007 | Mitani | 358/1.18 |
| 2007/0188808 A1* | 8/2007 | Tsuboi | 358/1.18 |
| 2007/0188809 A1* | 8/2007 | Noda | 358/1.18 |
| 2007/0236722 A1* | 10/2007 | Ando et al. | 358/1.14 |
| 2008/0117463 A1* | 5/2008 | Ohkubo et al. | 358/1.18 |
| 2008/0247001 A1* | 10/2008 | Maki et al. | 358/3.26 |
| 2008/0278737 A1* | 11/2008 | Kajihara et al. | 358/1.9 |
| 2009/0091770 A1* | 4/2009 | Kano et al. | 358/1.1 |
| 2009/0091772 A1* | 4/2009 | Ujiie et al. | 358/1.9 |
| 2009/0237704 A1* | 9/2009 | Minowa | 358/1.14 |
| 2010/0128291 A1* | 5/2010 | Vendrow et al. | 358/1.9 |

FOREIGN PATENT DOCUMENTS

| | | |
|---|---|---|
| JP | 2002-292964 A | 10/2002 |
| JP | 2004-079142 A | 3/2004 |
| JP | 2004-122583 A | 4/2004 |

(Continued)

OTHER PUBLICATIONS

Japan Patent Office, Decision of Refusal for Japanese Patent Application No. 2008-332590, dispatched Aug. 16, 2011.

(Continued)

*Primary Examiner* — King Poon
*Assistant Examiner* — Ted Barnes
(74) *Attorney, Agent, or Firm* — Baker Botts L.L.P.

(57) ABSTRACT

A printer equipped with a display panel and configured to perform printing on a label surface of a disc based on an image displayed on the display panel, including: a displaying portion configured to display, on the display panel, (a) a subject image that is based on stored image data and (b) a disc frame representing a printable region of the label surface of the disc, such that the disc frame is superimposed on the subject image; a modifying portion configured to modify the subject image on the basis of an input operation by a user, such that the subject image is moved, enlarged, or reduced relative to the disc frame; and a printing portion configured to print, on the label surface of the disc, a part of the subject image existing within the disc frame.

9 Claims, 12 Drawing Sheets

FOREIGN PATENT DOCUMENTS

| | | |
|---|---|---|
| JP | 2004-160835 A | 6/2004 |
| JP | 2005-059312 A | 3/2005 |
| JP | 2007-196467 A | 8/2007 |
| JP | 2009-010698 A | 1/2009 |
| JP | 2009-060562 A | 3/2009 |

OTHER PUBLICATIONS

Japan Patent Office, Notification of Reasons for Refusal for Japanese Patent Application No. 2008-332590, dispatched Dec. 14, 2010.

* cited by examiner

PRINTER AND METHOD OF PRINTING

CROSS REFERENCE TO RELATED APPLICATION

The present application claims priority from Japanese Patent Application No. 2008-332590, which was filed on Dec. 26, 2008, the disclosure of which is herein incorporated by reference in its entirety.

BACKGROUND OF THE INVENTION

1. Field of the Invention

The present invention relates to a printer and a method of printing and more particularly to such a printer and method for printing an image on a label surface of a disc.

2. Discussion of Related Art

As writable discs such as CD-R/RW and DVD±R/RW recently become widely available, there are proposed various techniques of printing an image on a label surface of such discs.

For instance, there is disclosed a technique of adapting or fitting an image that is based on print data to a printable region of a surface of a disc when printing is performed on the disc surface.

SUMMARY OF THE INVENTION

In the above-described technique, a use of a personal computer is indispensable, and it is impossible to perform printing using the printer alone. In general, a display of the printer is smaller than a display of the personal computer, and the usability is inevitably lowered when printing is performed using the printer alone.

It is therefore an object of the invention to provide a printer and a method for printing an image on a label surface of a disc with high usability even when the printer is used alone.

The above-indicated object may be attained according to a principle of the invention, which provides a printer equipped with a display panel and configured to perform printing on a label surface of a disc based on an image indication displayed on the display panel, comprising:

a displaying portion configured to display, on the display panel, (a) a subject image that is based on stored image data and (b) a disc frame representing a printable region of the label surface of the disc, such that the disc frame is superimposed on the subject image;

a modifying portion configured to modify the subject image on the basis of an input operation by a user, such that the subject image is moved, enlarged, or reduced relative to the disc frame; and a printing portion configured to print, on the label surface of the disc, a part of the subject image existing within the disc frame.

BRIEF DESCRIPTION OF THE DRAWINGS

The above and other objects, features, advantages and technical and industrial significance of the present invention will be better understood by reading the following detailed description of a preferred embodiment of the invention, when considered in connection with the accompanying drawings, in which.

DETAILED DESCRIPTION OF THE PREFERRED EMBODIMENT

Figure 1:
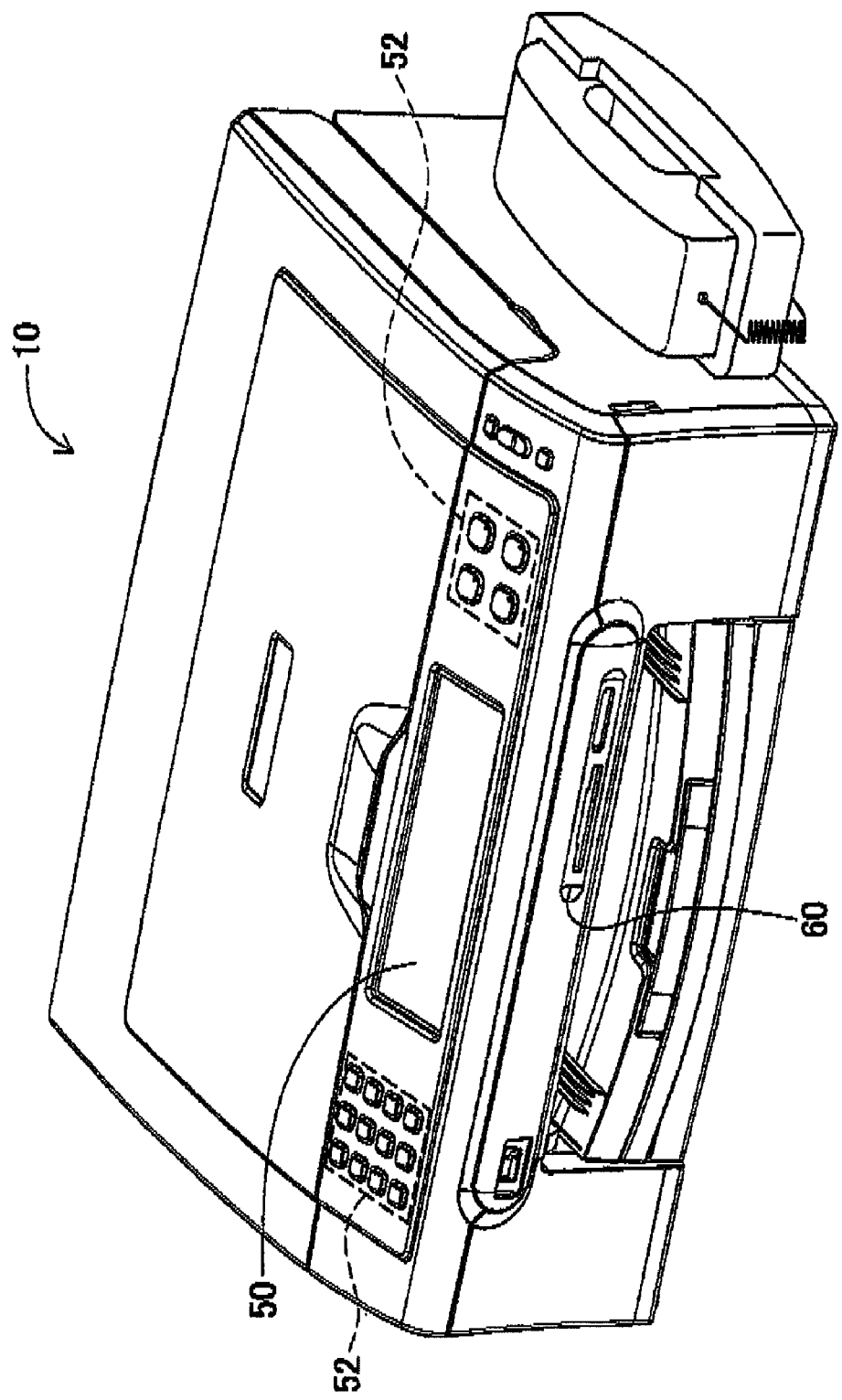
FIG. 1 is an external view showing a multifunction apparatus as a printer according to one embodiment of the invention.

There will be hereinafter described a preferred embodiment of the invention with reference to the drawings. FIG. 1 shows a multifunction apparatus 10 as a printer including a printer function, a scanner function, a copier function, a facsimile function, a telephone function, etc. As shown in FIG. 1, there are provided, on the front side of the upper surface of the multifunction apparatus 10, a display panel 50 and key pads 52. The display panel 50 is a touch-panel display through which coordinates of a position on the display panel 50 that a user touches can be detected. Each key pad 52 is constituted by a plurality of keys, and the user can input various instructions into the multifunction apparatus 10 through the display panel 50 and the key pads 52. A slot portion 60 is provided at the upper portion of the front surface of the apparatus 10. Various storage media can be insertable into the slot portion 60, and an image based on data stored in the storage medium that is inserted into the slot portion 60 can be printed. Inside the multifunction apparatus 10, there are provided a print carriage motor for driving a print carriage on which a print head is mounted, a scanner carriage motor for driving a scanner carriage on which a scanner sensor is mounted, and so on.

Figure 2:
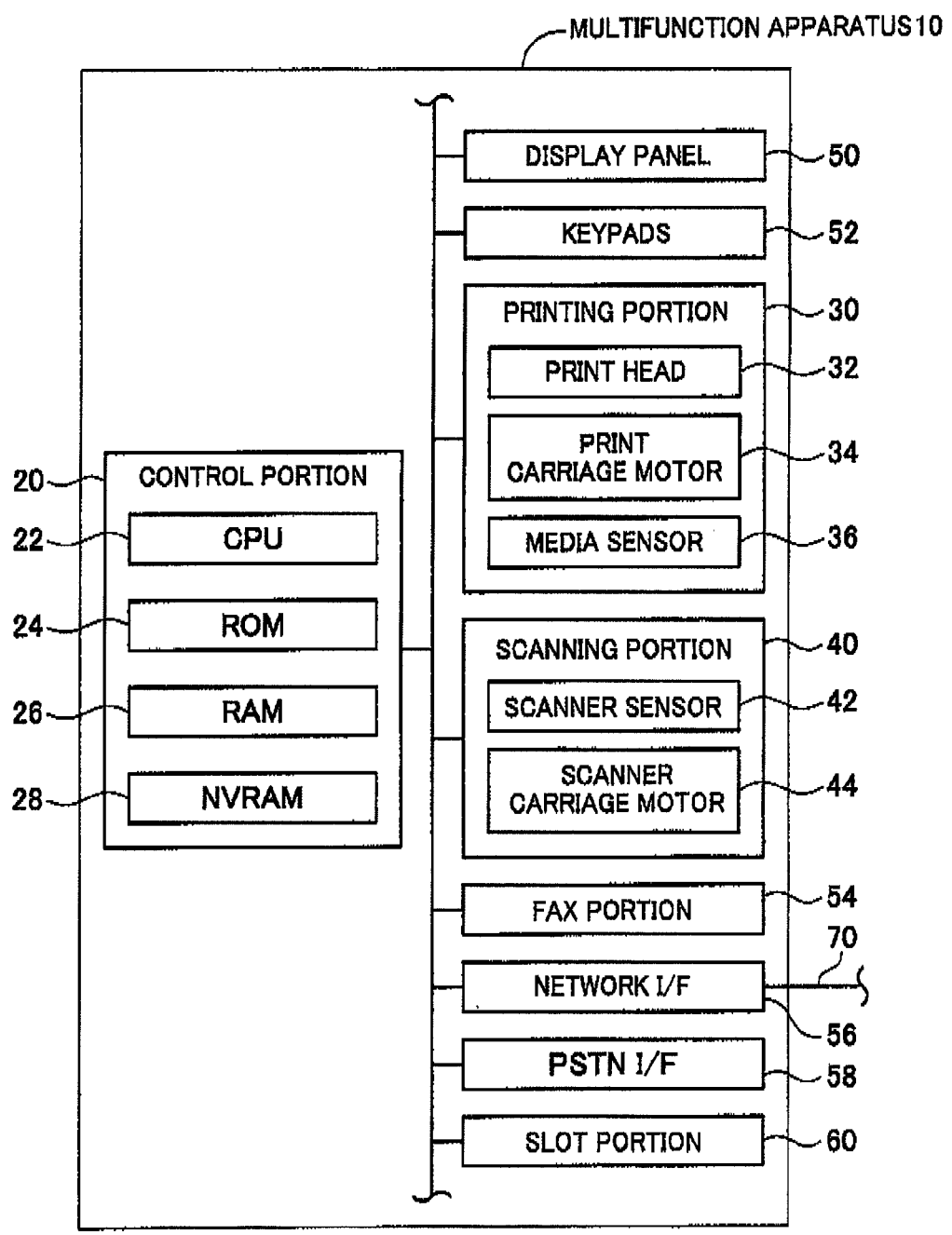
FIG. 2 is a block diagram showing a structure of the multifunction apparatus.
Figure 3:
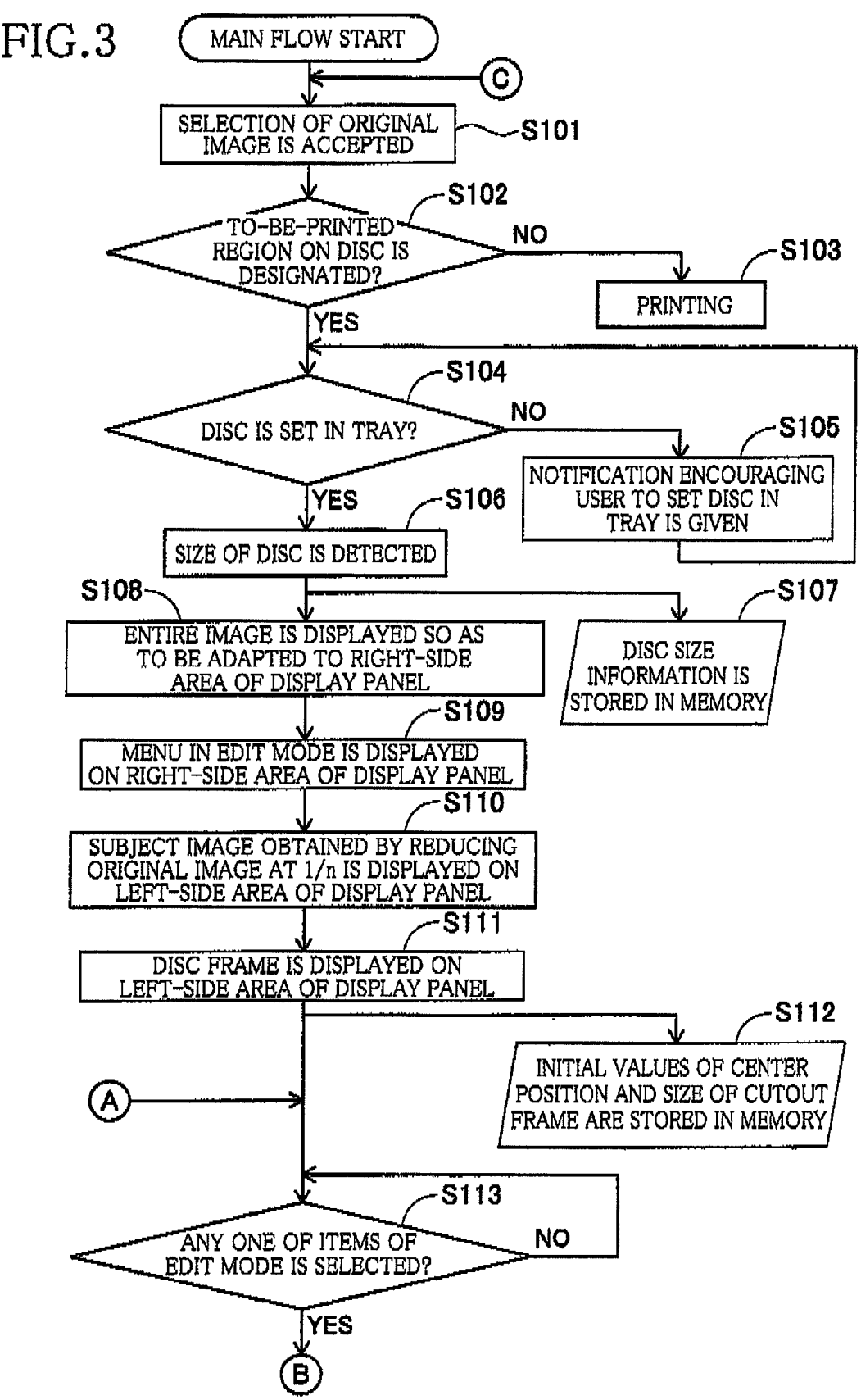
FIG. 3 is a part of a flow chart showing a main flow of printing processing.

As shown in the block diagram of FIG. 2, the multifunction apparatus 10 includes a control portion 20, the display panel 50, the key pads 52, a printing portion 30, a scanning portion 40, a FAX portion 54, a network interface 56, a PSTN interface 58, the slot portion 60, and so on.

The control portion 20 includes a CPU 22, a ROM 24, a RAM 26, an NVRAM 28, and so on. The CPU 22 executes various processing in accordance with programs stored in the ROM 24. The processing executed by the CPU 22 will be explained in detail. The ROM 24 stores programs for controlling operations of the multifunction apparatus 10. The RAM 26 stores various data formed during execution of the processing in accordance with the programs, such as display-image data based on which an image is displayed on the display panel 50 and print-image data based on which an image is printed on a medium. The NVRAM 28 stores various parameters used in execution of the processing by the CPU 22 in accordance with the programs, such as print settings and scan settings.

The printing portion 30 includes a print head 32, a print carriage motor 34, a media sensor 36, and so on. The print head 32 ejects ink according to commands from the control portion 20. The print carriage motor 34 drives the print carriage on which the print head 82 is mounted. The media sensor 36 is mounted on the print carriage together with the print head 32 and detects a medium on which printing is to be performed.

The scanning portion 40 includes a scanner sensor 42, a scanner carriage motor 44, and so on. The scanner sensor 42 is capable of reading image data stored in a medium on which scanning is carried out by the scanner sensor 42. The scanner carriage motor 44 drives the scanner carriage on which the scanner sensor 42 is mounted.

The network interface 56 is connected to a LAN line 70. The multifunction apparatus 10 can communicate with a personal computer connected to the LAN line 70 and is accessible to Internet. The PSTN interface 58 is connected to a public switched telephone network (PSTN) not shown. The PSTN is utilized in facsimile communication and telephone communication.

The thus constructed multifunction apparatus 10 is configured to perform printing on a label surface of a disc such as CD-R/RW or DVD±R/RW. Referring to the flow charts of FIGS. 3-9, there will be described printing processing performed by the multifunction apparatus 10.

Figure 4:
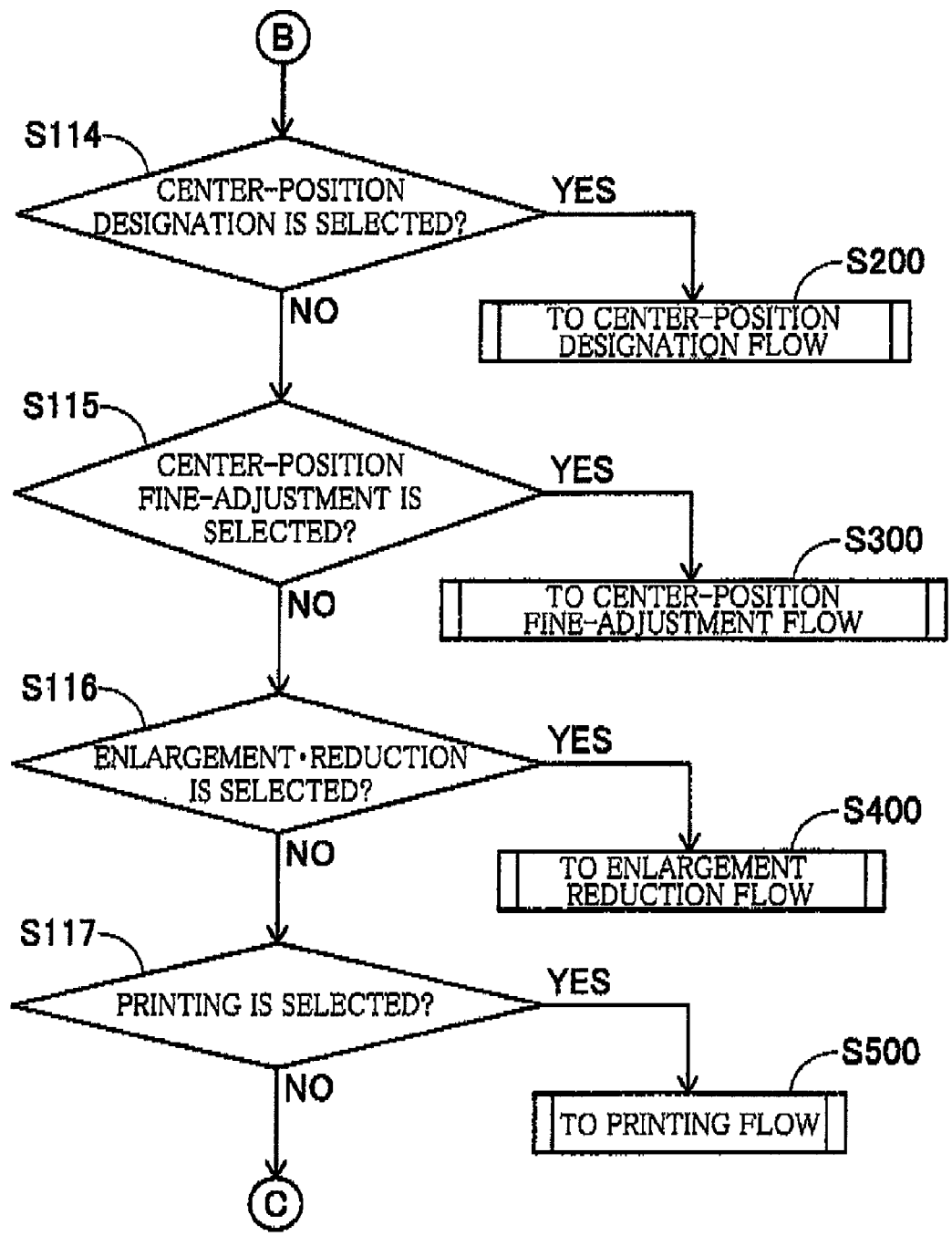
FIG. 4 is a part of the flow chart showing the main flow of the printing processing.
Figure 8:
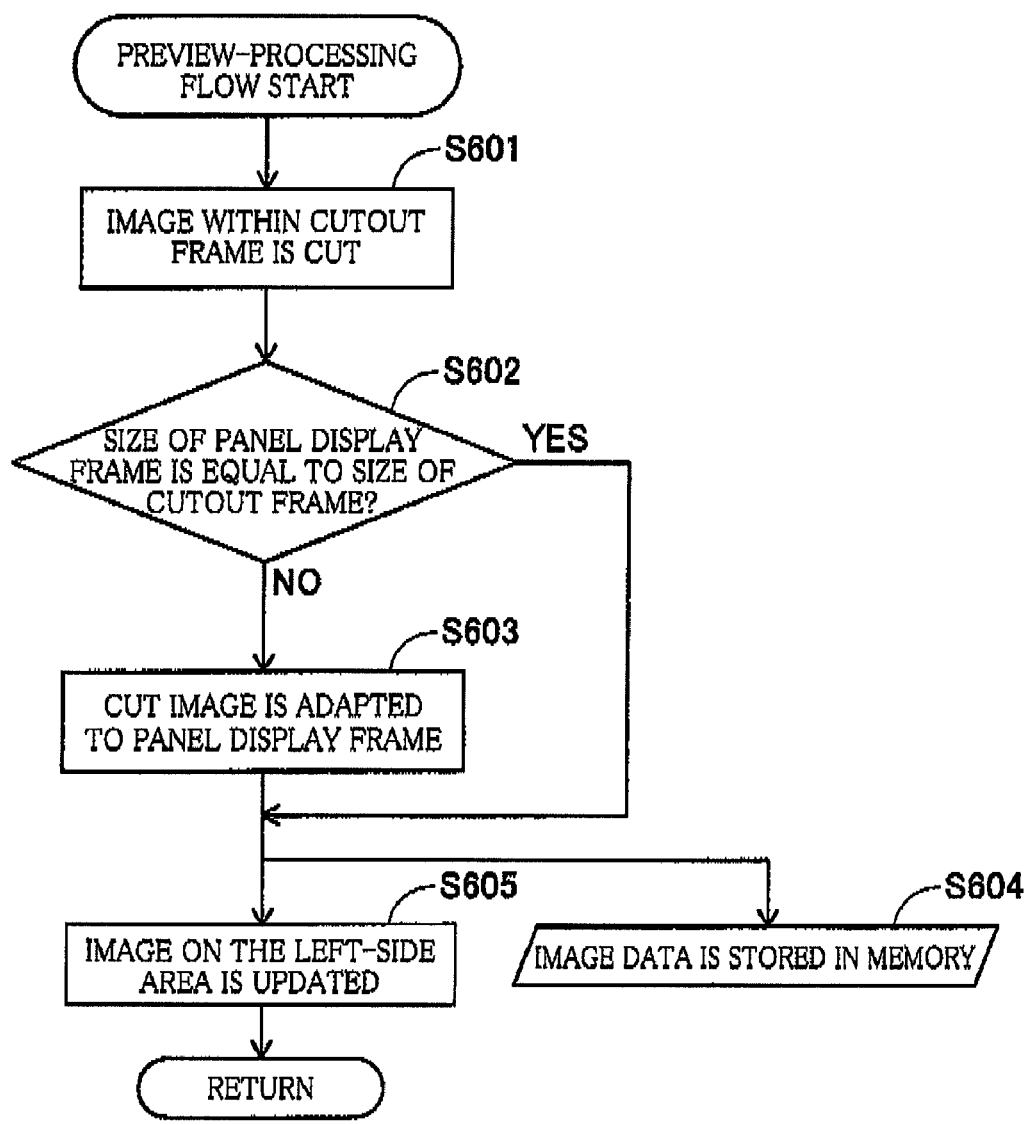
FIG. 8 is a flow chart showing a preview processing flow.
Figure 10A:
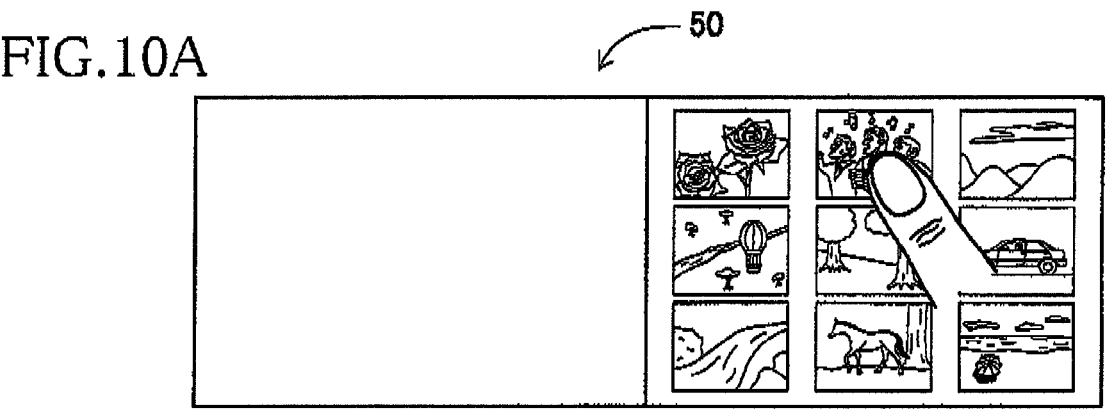
FIGS. 10A-10C are examples of views of a display panel.

The flow chart of FIGS. 8 and 4 showing a main flow of the printing processing starts with step S101 (hereinafter "step" is omitted where appropriate) in which the CPU 22 accepts selection of an original image to be printed on the label surface of the disc. For instance, thumbnail images are displayed on a right-side area of the display panel 50, as shown in FIG. 10A. The user touches a desired one of the thumbnail images with his/her finger, whereby the desired original image is selected. Data of the original image can be obtained arbitrarily. For instance, the data of the original image may be obtained through a memory card or the like inserted in the slot portion 60. Further, the data of the original image may be read from the media on which scanning by the scanning portion 40 is carried out. Moreover, the data of the original image may be obtained from the personal, computer connected to the LAN line 70, through the network interface 56. In addition, a suitable message that encourages the user to select a desired one of the original images may be displayed on a left-side area of the display panel 50. When the CPU 22 accepts the selection of the original image, the data of the selected original image is stored in the RAM 26.

S101 is followed by S102 in which the CPU 22 judges whether a region of the original image that is to be printed on the disc is designated, namely, the CPU 22 judges whether a to-be-printed region that is to be printed on the disc is designated for the original image selected in S101. The judgment may be made on the basis of the print settings pre-stored in the NVRAM 28 or may be made on the basis of determination by the user every time when printing on the label surface is performed. Where the designation of the to-be-printed region is not conducted (S102: NO), the CPU 22 implements S103 in which printing on the label surface of the disc is performed according to a standard setting.

On the other hand, where the designation of the to-be-printed region is conducted (S102: YES), the CPU 22 implements S104 in which it is judged whether the disc is already set in a print tray. The judgment may be made utilizing the media sensor 36. Where the disc is not yet set in the tray (S104: NO), the CPU 22 implements S105 to give the user a notification that encourages the user to set the disc in the tray, and thereafter the control flow goes back to S104. The notification in S105 is given to the user in the form of displaying of a message, outputting of an error sound, or the like.

On the other hand, where the disc is already set in the tray (S104: YES), the CPU 22 implements S106 in which the size of the disc is detected. More specifically, a light is emitted from a light-emitting portion of the media sensor 36 toward the label surface of the disc, and a reflected light reflected by the label surface is detected by a light-receiving portion of the media sensor 86. The color of the printable region of the label surface of the disc is white, so that the printable region has a high degree of reflectivity. In contrast, the non-printable region of the label surface is transparent. Further, the color of the tray is black, so that the tray has a low degree of reflectivity. Accordingly, by performing detection from a certain point of the peripheral edge of the disc to another point that is diametrically opposite to the certain point via the center of the disc, it is possible to obtain respective diameters of an outer circle and an inner circle that define the printable region. After the size of the disc is detected, the CPU 22 implements S107 in which information relating to the disc size is stored in the RAM 26. Thus, the printable region of the label surface of the disc can be automatically detected by the media sensor 36, whereby the present multifunction apparatus 10 is adaptable to various kinds of discs. Further, it is not necessary for the user to measure and input the size of the printable region, thereby reducing the burden to the user.

Thereafter, the CPU 22 implements S108 in which the entirety of the original image selected in S101 is displayed so as to be adapted to the right-side area of the display panel 50, namely, the entirety of the original image, i.e., an entire image, is displayed on the right-side area to the substantially fullest extent. The CPU 22 then implements S109 in which there is further displayed on the right-side area a menu in an edit mode. The menu in the edit mode includes various items such as designation of the center position, fine adjustment of the center position, enlargement-reduction, printing, and return. Subsequently, in S110, the CPU 22 executes data processing in which data of the original image stored in the RAM 26 is reduced such that the original image based on the data is reduced at a scaling factor of 1/n, thereby forming display-image data. A display image based on the formed display-image data is displayed on the left-side area of the display panel 50 and constitutes at least a part of the above-described entire image. The at least a part of the entire image is a subject image. Subsequently in S111, the CPU 22 executes data processing in which a disc frame that represents the printable region of the label surface of the disc is reduced so as to be adapted to the left-side area of the display panel 50, namely, the disc frame is displayed on the left-side area to the substantially fullest extent, on the basis of the disc size information stored in the RAM 26. The disc frame is displayed so as to be superimposed on the subject image.

The scaling factor 1/n at which the original image is reduced in S110 is the same as a scaling factor at which the disc frame is reduced so as to be adapted to the left-side area of the display panel 50 in S111. In the present embodiment, there will be explained a case in which the size of the printable region of the disc label surface, i.e., the size of the disc frame, is larger than the size of the left-side area of the display panel 50, that is, $n \geq 1$. Where the size of the disc frame is smaller than the site of the left-side area of the display panel 50, that is, $n < 1$, the reduction processing implemented in S110 and S111 is replaced with enlargement processing.

Figure 10B:
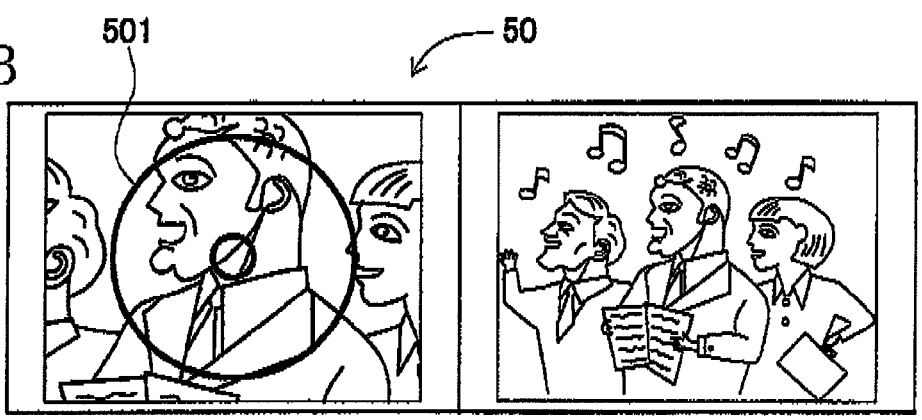

FIG. 10B shows an example of a view of the display panel 50 after the initial displaying processing of S108-S111. It is noted that the menu in the edit mode is not illustrated in FIG. 10B for simplicity. The CPU 22 executes the initial displaying processing of S108-S111 in which the disc frame 501 is displayed in a size that is reduced at the scaling factor that permits the disc frame 501 to be adapted to the left-side area of the display panel 50. As a result, the disc frame 501 is displayed on the left-side area of the display panel 50 to the substantially fullest extent as shown in FIG. 10B. Accordingly, even if the size of the left-side area of the display panel 50 is small, it can be efficiently utilized. Further, the CPU 22 executes data processing in which the original image is reduced at the same scaling factor at which the disc frame 501 is reduced, thereby forming the display-image data. Therefore, when the subject image is initially displayed on the left-side area of the display panel 50, a ratio of the size of the original image and the size of the printable region of the actual disc corresponds to a ratio of the size of the subject image displayed on the left-side area of the display panel 50 and the size of the disc frame 501 that is superimposed on the subject image. Accordingly, the usability can be enhanced.

Figure 12:
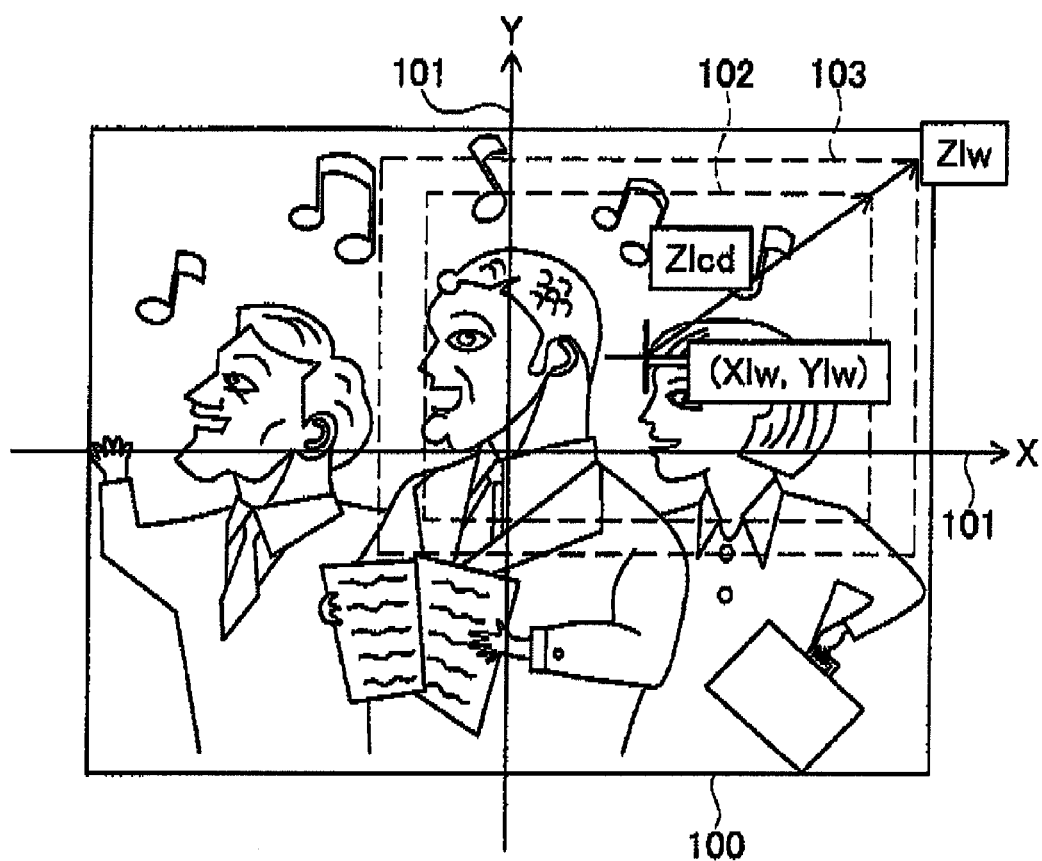
FIG. 12 is an image for explaining processing for displaying, on a left-side area of the display panel, a subject image based on display-image data.

Referring to FIG. 12, there will be explained processing of displaying, on the left-side area of the display panel 50, the subject image that is based on the display-image data. The CPU 22 stores, in the RAM 26, the display-image data that is obtained by reducing the original image at the scaling factor of 1/n. The image obtained by reducing the original image at the scaling factor of 1/n is referred to as the display image 100. The CPU 22 then sets coordinate axes 101 for the display image 100, such that the coordinates of the center of the display image 100 coincide with an origin of the coordinate axes 101.

In FIG. 12, a frame 102 is a panel display frame that represents the size of the left-side area of the display panel 50. A frame 103 is a cutout frame used in displaying, on the left-side area of the display panel 50, the subject image based on the display-image data. The center of the cutout frame 103 coincides with the center of the panel display frame 102 and the coordinates of the center of the cutout frame 103 are represented as (Xlw, Ylw). A distance Zlw from the center of the cutout frame 103 to an upper right-hand corner of the same 103 is a parameter indicative of the size of the cutout frame 103. A distance Zlcd from the center of the panel display frame 102 to an upper right-hand corner of the same 102 is a fixed value peculiar to the multifunction apparatus 10 and indicative of the size of the panel display frame 102. The cutout frame 103 is enlarged or reduced while maintaining, in an enlargement-reduction flow described below, an aspect ratio that is the same as the panel display frame 102.

When the subject image based on the display-image data is displayed on the left-side area of the display panel 50, the CPU 22 executes data processing in which a part of the display-image data corresponding to an image within the cutout frame 103 is extracted from the display-image data and an image based on the extracted data is adapted to the panel display frame 102. The image adapted to the panel display frame 102 is the subject image. The details of the data processing will be explained in a preview processing that will be described. In the present embodiment, the initial value of the distance Zlw is equal to Zlcd and the initial value of the coordinates (Xlw, Ylw) is equal to the origin, so that the initial display on the left-side area of the display panel 50 is represented as shown in FIG. 10S.

After the initial displaying processing of S108-S111, the CPU 22 implements S112 in which the initial value of the coordinates of the center position of the cutout frame 103 and the initial value of the size of the cut out frame 103, namely, the initial value of (Xlw, Ylw) and the initial value of Zlw, are stored in the RAM 26.

Subsequently, the CPU 22 implements S113 in which it is judged whether any one of the items of the menu in the edit mode among designation of the center position, fine adjustment of the center position, enlargement-reduction, printing, and return, is selected. Where no items are selected (S113: NO), the control flow goes back to S113. In other words, the CPU 22 is on standby while repeatedly implementing S113 until any one of the items is selected.

On the other hand, where any one of the items is selected (S113: YES), the control flow goes to S114 (FIG. 4). In S114-S117, the CPU 22 judges which one of the items of the menu in the edit mode is selected. Where the designation of the center position is selected (S114: YES), the CPU 22 implements a center-position designation flow shown in FIG. 5 (S200). Where the fine adjustment of the center position is selected (S115: YES), the CPU 22 implements a center-position fine-adjustment flow shown in FIG. 6 (S300). Where the enlargement-reduction is selected (S116: YES), the CPU 22 implements the enlargement-reduction flow shown in FIG. 7. Where the printing is selected (S117YES), the CPU 22 implements a printing flow shown in FIG. 9 (S500). Where none of the above items are selected (S114-S117: NO), it means that the item of return is selected, and the control flow goes back to S101.

Figure 5:
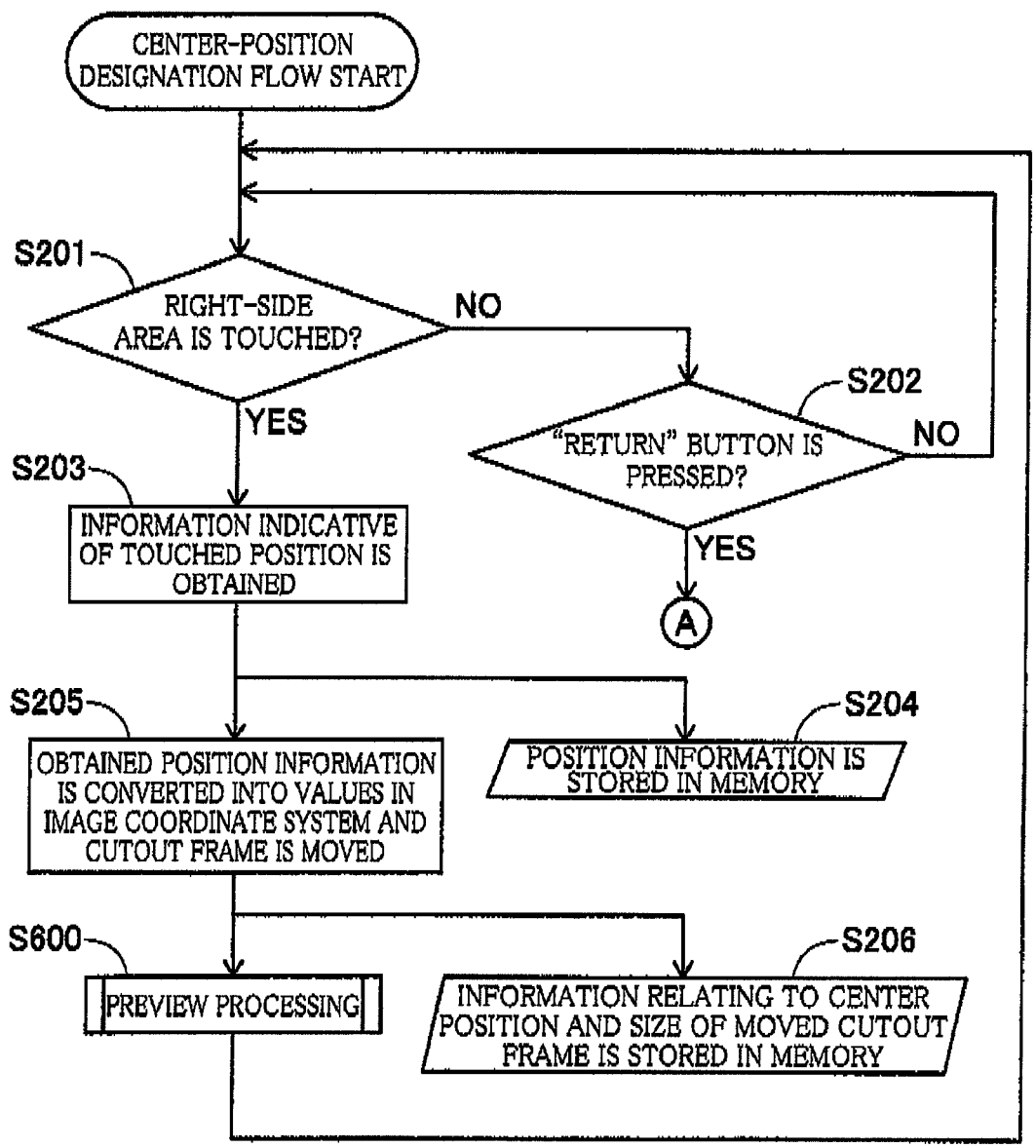
FIG. 5 is a flow chart showing a center-position designation flow.

Hereinafter, the above-indicated center-position designation flow, center-position fine-adjustment flow, enlargement-reduction flow, and printing flow will be explained. Referring first to FIG. 5, the center-position designation flow is explained. The CPU 22 implements S201 in which it is judged whether the right-side area of the display panel 50 has been touched by the user. Where the right-side area is not touched (S201: NO), the CPU 22 judges in S202 whether a "RETURN" button has been pressed. Where the "RETURN" button is not pressed (S202: NO), the control flow goes back to S201. In other words, the CPU 22 is on standby while repeatedly implementing S201 and S202 until the right-side area of the display panel 50 is touched or the "RETURN" button is pressed. Where the "RETURN" button has been pressed (S202: YES), the control flow goes back to S113. As the "RETURN" button, a cancel key in the key pad 52 may be utilized. Alternatively, a touch panel button displayed at a suitable position of the display panel 50 may be utilized as the "RETURN" button.

On the other hand, where the right-side area of the display panel 50 has been touched (S201: YES), the CPU 22 implements S208 in which information indicative of the position of the right-side area touched by the user is obtained. As the position information, the coordinates detected by the display panel 50 which is a touch-panel display may be utilized. When the position information is obtained, the CPU 22 implements S204 in which the position information is stored in the RAM 26.

The CPU 22 subsequently implements S205 in which the position information obtained in S208 is read out from the RAM 26 and is converted into values in an image coordinate system defined by the coordinate axes 101 shown in FIG. 12, and the cutout frame 103 is moved in accordance with the values in the image coordinate system. The position information obtained in S203 is represented as coordinates in a coordinate system (i.e., a display panel coordinate system) whose origin coincides with the center of the right-side area of the display panel 50, and the center position of the entire image displayed on the right-side area of the display panel 50 in S108 coincides with the center of the right-side area, namely, coincides with the origin of the display panel coordinate system. Accordingly, in S205, the cutout frame 103 is moved such that the coordinates (Xlw, Ylw) of the center of the cutout frame 103 become equal to $((1/\alpha)Xt, (1/\alpha)Yt)$, wherein "(Xt, Yt)" represents the position information (the coordinates in the display panel coordinate system) obtained in S203 and "α" represents a scaling factor by which the display image 100 (FIG. 12) based on the display-image data is adapted to the right-side area of the display panel 50. After S205, the CPU implements S206 in which information as to the center position and the size of the moved cutout 103, namely, the value of (Xlw, Ylw) and the value of Zlw of the cutout 103 after the cutout frame 103 has been moved, is stored in the RAM 26.

In S600, the CPU 22 executes the preview processing, and the control flow goes back to S201. The preview processing in S600 is explained with reference to FIG. 8. In S601, the CPU 22 executes data processing in which the data corresponding to the image within the cutout frame 103 is extracted from the display-image data. In S602, the CPU 22 judges whether the size of the panel display frame 102 is equal to the size of the cutout frame 103, namely, whether Zlw is equal to Zlcd. Where the size of the panel display frame 102 is not equal to the size of the cutout frame 103 (S602: NO), the CPU 22 executes, in S603, data processing in which an image within the cutout frame 103 based on the extracted data obtained in S601 is adapted to the right-side area of the display panel 50. More specifically, the CPU 22 executes data processing in which the image within the cutout frame 103 is enlarged or reduced at a scaling factor of Zlcd/Zlw. After the data processing in S603, the CPU 22 implements S604 in which the processed data is stored in the RAM 26.

On the other hand, where the size of the panel display frame 102 is equal to the size of the cutout frame 103 (S602: YES), the CPU 22 implements S604 in which the extracted data corresponding to the image within the cutout frame 103 is stored in the RAM 26, without executing the data processing in S603.

The CPU subsequently implements S605 in which the subject image displayed on the left-side area of the display panel 50 is updated in accordance with the image data stored in the RAM 26 in S604. Thus, the preview processing is ended.

Figure 10C:
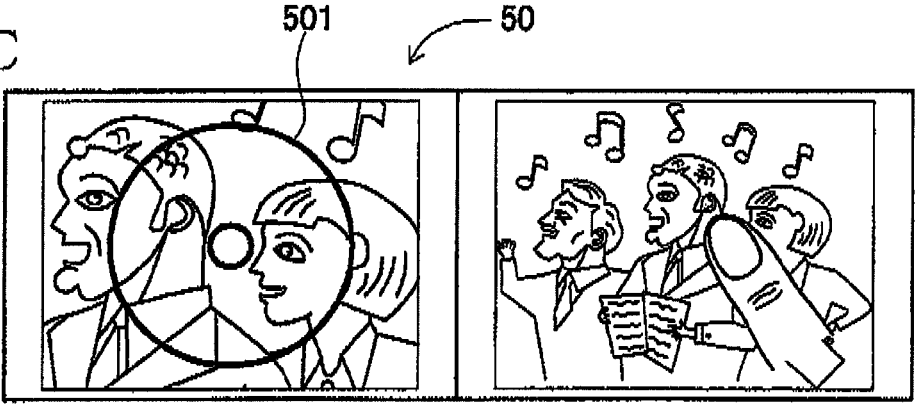

FIG. 10C shows an example of a view of the display panel 50 after the center-position designation processing (S201-S206) and the preview processing (S601-S605) explained above. As shown in FIG. 10C, in a state in which the entire image is displayed on the right-side area of the display panel 50 while the subject image is displayed on the left-side area of the display panel 50, where the user touches the entire image displayed on the right-side area, the center of the subject image displayed on the left-side area can be moved. Accordingly, the user can easily designate a part of the entire image to be printed on the label surface of the disc while viewing both of the entire image and the subject image.

Figure 6:
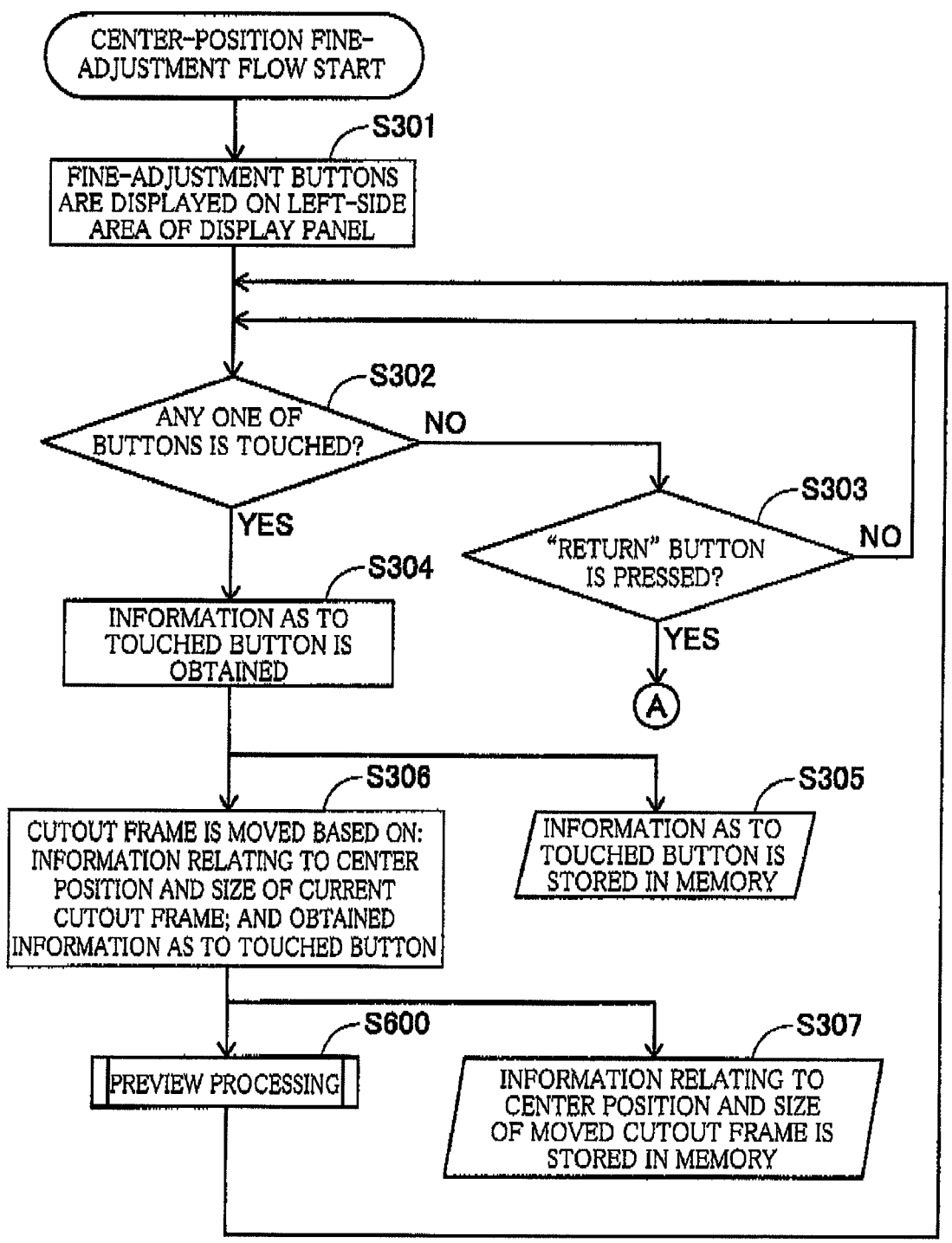
FIG. 6 is a flow chart showing a center-position fine-adjustment flow.
Figure 11A:
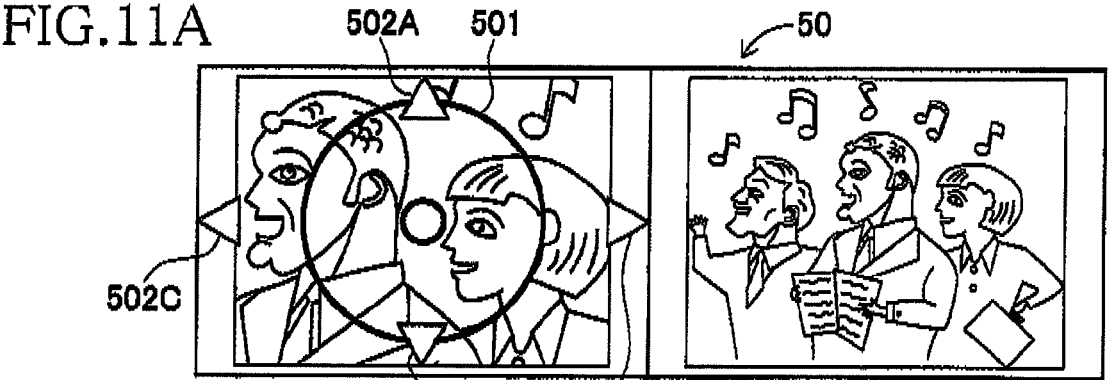
FIGS. 11A-11D are examples of views of the display panel.

Referring next to FIG. 6, the center-position fine-adjustment flow is explained. The CPU 22 implements S801 in which fine-adjustment buttons 502A-502D are displayed respectively at an upper end, a lower end, a left end, and a right end, of the left-side area of the display panel 50, as shown in FIG. 11A. S301 is followed by S302 in which the CPU 22 judges whether any one of the fine-adjustment buttons 502A-502D has been touched. Where none of the fine-adjustment buttons 502A-502D are touched (S802: NO), the CPU 22 implements S303 in which the "RETURN" button has been pressed. Where the "RETURN" button is not pressed (S303: NO), the control flow goes back to S802. That is, the CPU 22 is on standby while repeatedly implementing S302 and S303 until any one of the fine-adjustment buttons 502A-502D is touched or the "RETURN" button is pressed. Where the "RETURN" button has been pressed (S803: YES), the control flow goes back to S113.

On the other hand, where any one of the fine-adjustment buttons 502A-502D has been touched (S802: YES), the CPU implements S304 in which information of the touched button, namely, information that indicates which one of the buttons 502A-502D has been touched, is obtained. The obtained information as to the touched button is stored in the RAM 26 in S305.

Subsequently, S306 is implemented in which the CPU 22 reads out, from the RAM 26, (a) information relating to the center position and the size of the current cutout frame 103, namely, a current value of (Xlw, Ylw) and a current value of Zlw, and (b) the information as to the touched button obtained in S304. On the basis of the thus read information, the cutout frame 103 is moved. More specifically, the CPU 22 executes the following calculations in S306 so as to move the cutout frame 103.

(1) in a case in which the upper fine-adjustment button 502A has been touched:

$$Xlw=Xlw$$

$$Ylw=Ylw-\Delta$$

$$Zlw=Zlw$$

(2) in a case in which the lower fine-adjustment button 502B has been touched:

$$Xlw=Xlw$$

$$Ylw=Ylw+\Delta$$

$$Zlw=Zlw$$

(3) in a case in which the left fine-adjustment button 502C has been touched:

$$Xlw=Xlw+\Delta$$

$$Ylw=Ylw$$

$$Zlw=Zlw$$

(4) in a case in which the right fine-adjustment button 502D has been touched:

$$Xlw=Xlw-\Delta$$

$$Ylw=Ylw$$

$$Zlw=Zlw$$

Here, "Δ" is a displacement amount of the cutout frame 103 when each of the fine-adjustment buttons 502A-502D has been touched once. After S306, the CPU implements S307 in which information relating to the center position and the size of the moved cutout frame 103, namely, the value of (Xlw, Ylw) and the value of Zlw after the cutout frame 103 has been moved, is stored in the RAM 26.

The CPU then implements S600 in which the preview processing is executed, and the control flow goes back to S302. Since the preview processing in S600 has been already explained above, its explanation is not repeated.

Figure 11B:
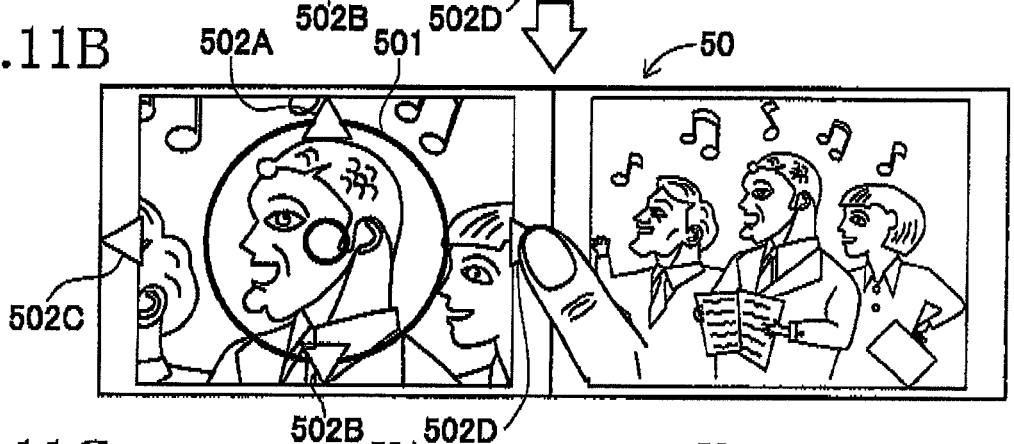

FIG. 11B shows an example of a view of the display panel 50 after the center-position fine-adjustment processing (S301-S307) and the preview processing (S601-S605). In a state in which the fine-adjustment buttons 502A-502D are being displayed on the left-side area of the display panel 50 shown in FIG. 11A, where the user touches the right fine-adjustment button 502D, for instance, the subject image displayed on the left-side area can be slid or moved toward the right side, as shown in FIG. 11B. Thus, each of the fine-adjustment buttons 502A-502D is as an auxiliary image functioning as a guide for moving the subject image, on the basis of the touching operation by the user.

Figure 7:
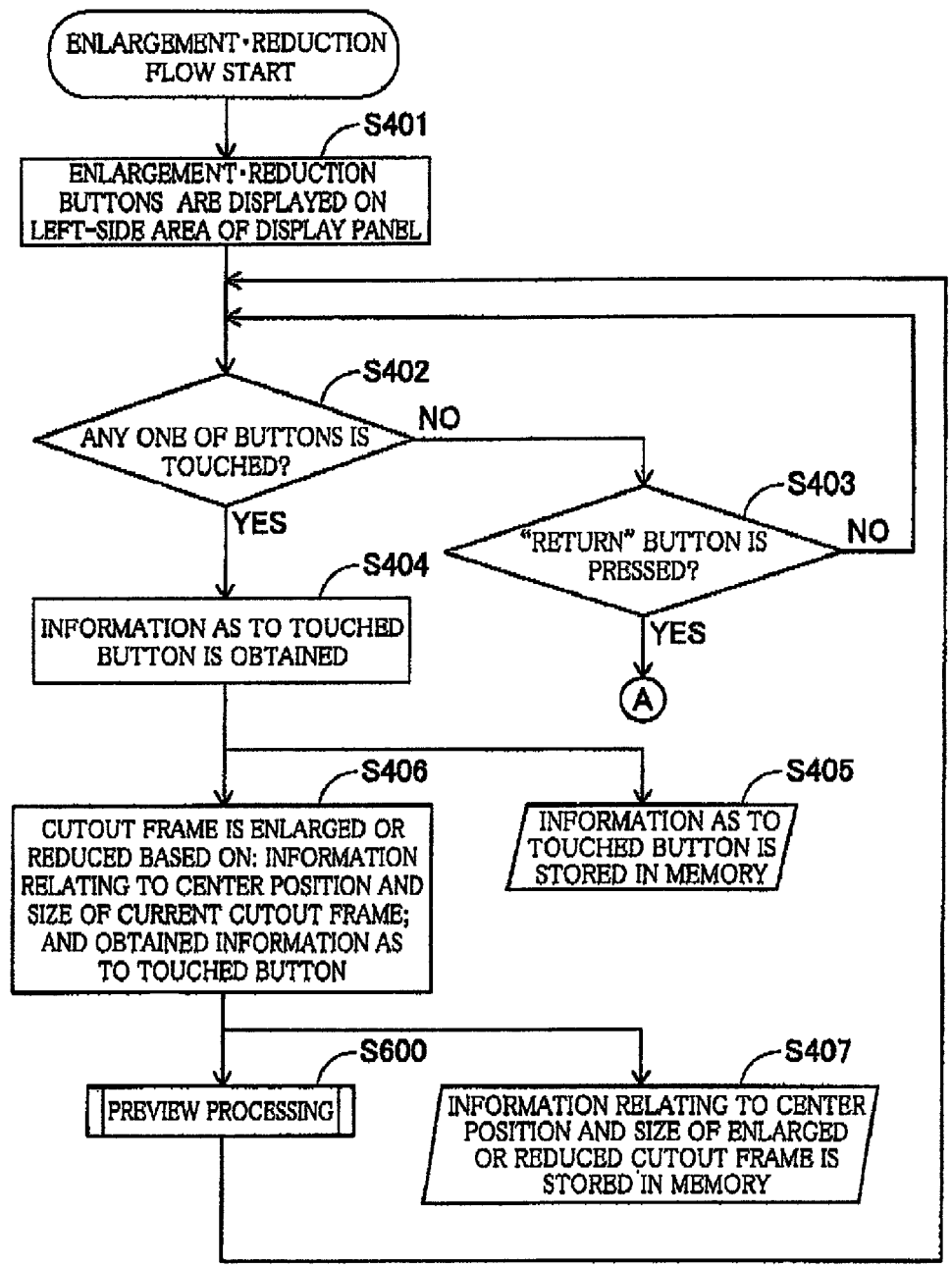
FIG. 7 is a flow chart showing an enlargement-reduction flow.
Figure 11C:

Referring next to FIG. 7, the enlargement-reduction flow is explained. The CPU 22 implements S401 in which enlargement-reduction buttons 503A, 503B each having an arcuate shape are respectively displayed at the left end and the right end of the left-side area of the display panel 50, as shown in FIG. 11C. The CPU 22 then implements S402 in which it is judged whether any one of the enlargement-reduction buttons 503A, 503B has been touched. Where none of the enlargement-reduction buttons 503A, 503B are touched (S402: NO), the CPU 22 judges in S403 whether the "RETURN" button has been pressed. Where the "RETURN" button is not pressed (S403: NO), the control flow goes back to S402. That is, the CPU 22 is on standby while repeatedly implementing S402 and S403 until any one of the enlargement-reduction buttons 503A, 503B is touched or the "RETURN" button is pressed. Where the "RETURN" button has been pressed (S403: YES), the control flow goes back to S113.

On the other hand, where any one of the enlargement-reduction buttons 503A, 503B has been touched (S402: YES), the CPU 22 implements S404 in which information as to the touched button, namely, information that indicates which one of the buttons 503A, 503D has been touched, is obtained. In the present embodiment, the button 503A with a clockwise arrow functions as a reduction button while the button 503B with a counterclockwise arrow functions as an enlargement button. The obtained information as to the touched button is stored in the RAM 26 in S405.

Subsequently, S406 is implemented in which the CPU 22 reads out, from the RAM 26, (a) information relating to the center position and the size of the current cutout frame 103, namely, a current value of (Xlw, Ylw) and a current value of Zlw, and (b) the information as to the touched button obtained in S404. On the basis of the thus read information, the cutout frame 103 is enlarged or reduced. More specifically, the CPU 22 executes the following calculations in S406 so as to enlarge or reduce the cutout frame 103.

(1) in a case in which the reduction button 503A has been touched:

$Xlw=Xlw$ $Ylw=Ylw$ $Zlw=Zlw+\omega$ (2) in a case in which the enlargement button 503B has been touched:

$Xlw=Xlw$ $Ylw=Ylw$ $Zlw=Zlw-\omega$

Here, $\omega$ is a displacement amount of the cutout frame 103 when the reduction button 503A or the enlargement button 503D has been touched once. After S406, the CPU implements S407 in which information relating to the center position and the size of the enlarged or reduced cutout frame 103, namely, the value of (Xlw, Ylw) and the value of Zlw after the cutout frame 103 has been enlarged or reduced, is stored in the RAM 26.

The CPU then implements S600 in which the preview processing is executed, and the control flow goes back to S402. Since the preview processing in S600 has been already explained above, its explanation is not repeated.

Figure 11D:
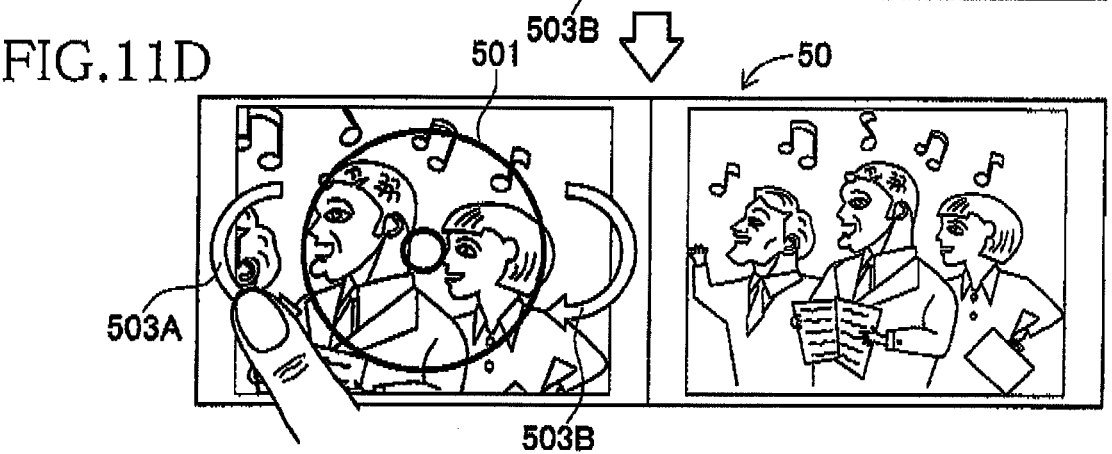

FIG. 11D shows an example of a view of the display panel 50 after the enlargement-reduction processing (S401-S407) and the preview processing (S601-S605). In a state in which the enlargement-reduction buttons 503A, 503B are being displayed on the left-side area of the display panels 50 as shown in FIG. 11C, where the user touches the reduction button 503A with the counterclockwise arrow, for instance, the subject image displayed on the left-side area is reduced as shown in FIG. 11D. Thus, the subject image can be enlarged or reduced by touching the arcuate enlargement-reduction buttons 503A, 503B in the clockwise or counterclockwise direction. Accordingly, the user can conduct an input operation for enlarging or reducing the subject image intuitively as in a zooming operation in a camera and a projector. It is noted that each of the buttons 503A, 503B displayed in the form of an arcuate symbol functions as an auxiliary image for enlarging or reducing the subject image on the basis of the touching operation by the user.

Figure 9:
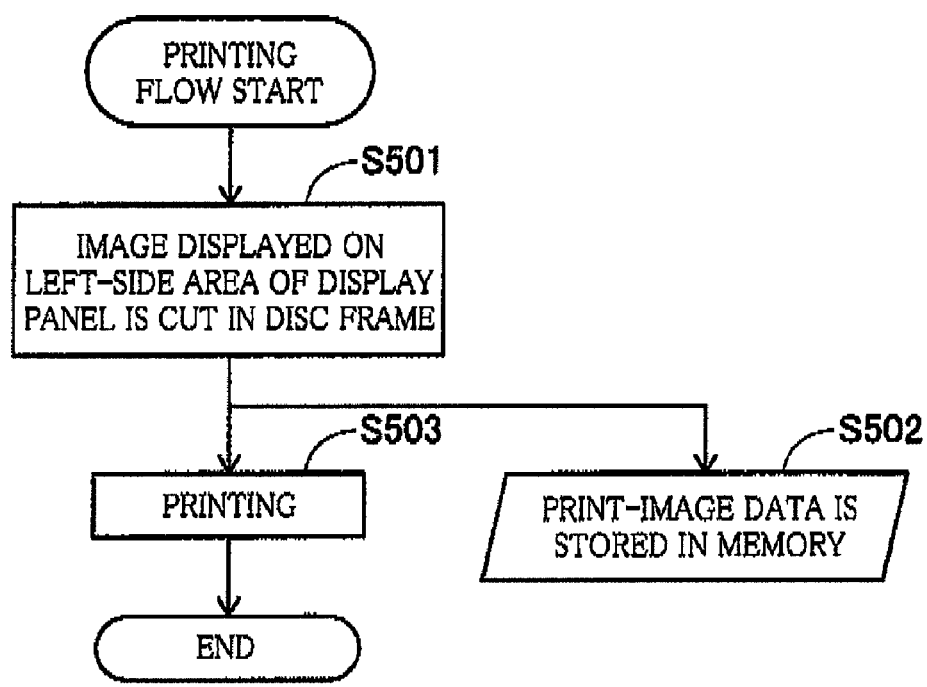
FIG. 9 is a flow chart showing a printing flow.

Referring next to FIG. 9, the printing flow is explained. In S501, the CPU 22 executes data processing in which a specific part of the data of the subject image displayed on the left-side area of the display panel 50 is extracted, which specific part of the data corresponds to a part of the subject image existing within the disc frame 501. Thus, there is formed data of an image that is to be printed on the label surface of the disc, namely, there is generated print-image data. More specifically, the CPU 22 executes data processing in which the specific part of the data corresponding to the part of the subject image existing within a region defined by the outer circle and the inner circle of the disc frame 501 is extracted from the data of the subject image displayed on the left-side area of the display panel 50. The CPU 22 then implements S502 in which the extracted data is stored in the RAM 26 as the print-image data based on which an image is printed on the label surface of the disc.

Subsequently, the CPU 22 implements S503 in which the image is printed on the label surface of the disc on the basis of the print-image data stored in the RAM 26 in S502. Thus, the printing processing by the multifunction apparatus 10 is ended.

In the illustrated embodiment, the display panel 50 is one example of a touch-panel display. The RAM 26 is one example of a memory. The media sensor 36 is one example of a sensor. The multifunction apparatus 10 is one example of a printer. A portion of the CPU 22 that executes processing in S108-S111 is one example of initial displaying means and constitutes a displaying portion. The center-position designation flow, the center-position fine-adjustment flow, and the enlargement-reduction flow are one example of editing means and constitute a modifying portion. The preview processing flow is one example of display updating means. The printing flow is one example of printing means and constitutes a printing portion.

As explained in the illustrated embodiment, in the initial displaying processing of S108-S111 executed by the CPU 22, the disc frame 501 representing the printable region of the label surface of the disc is displayed in a size reduced at the scaling factor of 1/n that permits the disc frame 501 to be adapted to the left•side area of the display panel 50, such that the disc frame 501 is superimposed on the subject image. Accordingly, the disc frame 501 is displayed on the left-side area of the display panel 50 to the substantially fullest extent. Further, the CPU 22 executes data processing in which the data of the original image is reduced at the same scaling factor at which the disc frame 501 is reduced, thereby forming the display-image data. Therefore, when the subject image is initially displayed on the left-side area of the display panel 50, a ratio of the size of the original image and the size of the printable region of the actual disc corresponds to a ratio of the size of the subject image displayed on the left-side area of the display panel 50 and the size of the disc frame 501 that is superimposed on the subject image. Accordingly, the usability can be enhanced.

The CPU 22 further executes, in the center-position designation flow, the center-position fine-adjustment flow, and the enlargement-reduction flow, data processing in which the subject image displayed on the left-side area of the display panel 50 is moved, enlarged, or reduced relative to the disc frame 501 that is displayed in a size reduced at the scaling factor of 1/n, on the basis of the input operation by the user. Further, in the preview-processing flow, the subject image is updated so as to reflect the results of data processing in the center-position designation flow, the center-position fine-adjustment flow, and the enlargement-reduction flow. Accordingly, the user can conduct the input operation in which the subject image is moved, enlarged, or reduced relative to the disc frame 501 that is fixedly displayed on the display panel 50 in the size reduced at the scaling factor of 1/n. Therefore, as compared in an instance where the disc frame 501 is moved, enlarged, or reduced relative to the subject image, the arrangement ensures easy view of the preview display of the to-be-printed image even in the small area of the display panel 50, thereby improving the usability.

Further, owing to the dual displaying on the display panel 50, the arcuate enlargement-reduction buttons 503A, 503B, the automatic detection of the printable region by the media sensor 36, and so on, the present multifunction apparatus 10 ensures the user of ease of use.

In the illustrated embodiment, the preview processing is executed based on the size of the actual original image. Accordingly, the resolution of the image is reflected in the preview display, thereby offering the user the preview display close to the actual printed image.

In the illustrated embodiment, even when the multifunction apparatus 10 is used alone, the image can be printed on the label surface of the disc with good usability.

While the presently preferred embodiment has been described, it is noted that the invention is not limited to the details of the illustrated embodiment, but may be embodied with various changes and modifications, which may occur to those skilled in the art, without departing from the spirit and scope of the invention defined in the attached claims.

Each of the flow charts in the illustrated embodiment may be replaced with another one, as long as the effects similar to those obtained by processing executed according to the present flow charts can be obtained. In the illustrated embodiment, the processing is executed based on the number of touch on the fine-adjustment buttons 502A-502D and the enlargement-reduction buttons 503A, 503B. The processing may be executed based on a distance by which each button is touched or a time during which each button is touched.

What is claimed is:

1. A printer equipped with a touch-panel display and configured to perform printing on a label surface of a disc based on an image indication displayed on the touch-panel display, comprising:

a displaying portion configured to display, on one of two areas of the touch-panel display an entire image based on image data, and configured to display, on the other of the two areas, a subject image that is a part of the entire image and a disc frame representing a printable region of the label surface of the disc, such that the disc frame is superimposed on the subject image, the touch-panel display being divided into the two areas;

a modifying portion configured to modify the subject image on the basis of an input operation by a user, such that the subject image is moved, enlarged, or reduced relative to the disc frame; and a printing portion configured to print, on the label surface of the disc, a part of the subject image existing within the disc frame, wherein the displaying portion is configured to display the entire image at a scaling factor adapted to a size of the one of the two areas, and display the subject image at a scaling factor which is greater than that of the entire image, wherein, when the input operation comprising a touching operation to the entire image by the user occurs, the subject image is extracted from the entire image such that the subject image includes a touch-area image which corresponds to a part of the entire image and which is displayed at an area in the touch-panel display touched by the touching operation, wherein the displaying portion is configured to display the extracted subject image and the disc frame on the other of the two areas.

2. The printer according to claim 1, wherein the modifying portion is configured to move the subject image indicated on the other of the two areas relative to the disc frame, on the basis of the input operation by the user performed with respect to the entire image displayed on the one of the two areas.

3. The printer according to claim 1, wherein the displaying portion is configured to display the disc frame at a scaling factor adapted to a size of the touch-panel display and to display, as the subject image, at least a part of an image obtained by enlarging or reducing, at the scaling factor, an entire image that is based on the image data, when the subject image is initially displayed on the display panel by the displaying portion.

4. The printer according to claim 1, wherein the modifying portion is configured to display, on the touch-panel display, an auxiliary image functioning as a guide for the input operation of moving, enlarging or reducing the subject image relative to the disc frame and to move, enlarge or reduce the subject image relative to the disc frame, on the basis of the touching operation on the display panel by the user according to the guide.

5. The printer according to claim 4, wherein the modifying portion is configured to display at least one accurate symbol as the auxiliary image and to enlarge or reduce the subject image relative to the disc frame on the basis of the touching operation along the at least one accurate symbol in a clockwise or counterclockwise direction.

6. The printer according to claim 1, further comprising a sensor for detecting the printable region, wherein the displaying portion is configured to display the disc frame on the basis of a result of detection by the sensor.

7. A method of performing printing on a label surface of a disc utilizing a printer equipped with a touch-panel display, the method comprising the steps of:

dividing the touch-panel display into two areas;

displaying an entire image based on image data, on one of the two areas;

displaying a subject image, that is a part of the entire image and a disc frame, that is representing a printable region of the label surface of the disc on the other of the two areas, such that the disc frame is superimposed on the subject image, wherein the entire image is displayed at a scaling factor adapted to a size of the one of the two areas and the subject image is displayed at a scaling factor which is greater than that of the entire image;

when an input operation comprising a touching operation to the entire image by the user occurs, extracting the subject image from the entire image such that the subject image includes a touch-area image which is a part of the entire image and which is displayed at an area in the touch-panel display touched by the touching operation, displaying the extracted subject image and the disc frame on the other of the two areas;

moving, enlarging, or reducing the subject image relative to the disc frame, on the basis of an input operation by a user; and printing, on the label surface of the disc, a part of the subject image existing within the disc frame.

8. The printer according to claim 1, wherein the subject image is extracted such that the subject image includes the touch-area image at the center thereof.

9. The printer according to claim 1, wherein the displaying portion is configured to display, on the touch-panel display, at least one identifying image to identify the image data, wherein, when the touching operation to one of the at least one identifying image occurs, the displaying portion is configured to display the entire image on the one of the two areas, wherein the entire image being displayed is based on the image data corresponding to the touched identifying image, wherein the displaying portion is configured to extract the subject image such that the subject image includes, at the center thereof, a part image corresponding to a part of the entire image and is configured to perform a first displaying operation to display, on the other of the two areas, the subject image at the scaling factor which is greater than that of the entire image, and wherein, when the touching operation to the entire image displayed on the one of the two areas occurs, the displaying portion is configured to extract the subject image such that the subject image includes, at the center thereof, the touch-area image and is configured to display, on the other of the two areas, the subject image at the scaling factor which is the same as that of the subject image displayed by the first displaying operation.

* * * * *